US008749832B2

(12) United States Patent
Mizutani (10) Patent No.: US 8,749,832 B2
(45) Date of Patent: Jun. 10, 2014

(54) INFORMATION PROCESSING DEVICE (75) Inventor: Norio Mizutani, Mie-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1869 days.

(21) Appl. No.: 11/726,764

(22) Filed: Mar. 23, 2007

(65) Prior Publication Data

US 2007/0226748 A1     Sep. 27, 2007

(30) Foreign Application Priority Data

Mar. 24, 2006  (JP) ................. 2006-084263

(51) Int. Cl.
*H04N 1/40* (2006.01)
*G06K 15/00* (2006.01)
*G06F 3/12* (2006.01)
*G06K 9/34* (2006.01)
*H04N 1/60* (2006.01)
*H04N 1/46* (2006.01)

(52) U.S. Cl.
USPC ......... 358/1.18; 358/1.9; 358/3.24; 358/1.13; 358/1.17; 358/538; 358/448; 358/462; 382/173; 382/176; 382/180; 715/251; 715/253; 715/273

(58) Field of Classification Search
USPC .......... 358/1.15–1.17, 4.3–4.4, 407, 453, 1.9, 358/3.24, 1.13, 1.18, 538, 448, 462; 707/4, 707/6, 9–10, 102–103; 355/82, 132; 399/362; 382/173, 176, 180; 715/251, 715/253, 273
See application file for complete search history.

(56) References Cited

U.S. PATENT DOCUMENTS

| | | | |
|---|---|---|---|
| 6,750,978 B1 * | 6/2004 | Marggraff et al. | 358/1.12 |
| 6,791,703 B1 * | 9/2004 | Maeda et al. | 358/1.15 |
| 7,103,837 B2 * | 9/2006 | Sato | 715/274 |
| 7,253,919 B2 * | 8/2007 | Hull et al. | 358/1.18 |
| 7,392,533 B2 * | 6/2008 | Ternasky et al. | 726/2 |
| 7,471,401 B2 * | 12/2008 | Saito | 358/1.13 |
| 7,495,795 B2 * | 2/2009 | Graham et al. | 358/1.18 |
| 7,528,976 B2 * | 5/2009 | Hart et al. | 358/1.15 |
| 7,573,604 B2 * | 8/2009 | Hull et al. | 358/1.8 |
| 7,679,774 B2 * | 3/2010 | Petz | 358/1.18 |
| 7,685,517 B2 * | 3/2010 | Tomita et al. | 715/276 |
| 8,386,945 B1 * | 2/2013 | Hansen et al. | 715/765 |
| 8,564,844 B2 * | 10/2013 | Brunner | 358/405 |

(Continued)

FOREIGN PATENT DOCUMENTS

| | | |
|---|---|---|
| JP | 4-340660 | 11/1992 |
| JP | 7-307859 | 11/1995 |

(Continued)

*Primary Examiner* — Barbara Reinier
*Assistant Examiner* — Jonathan Beckley
(74) *Attorney, Agent, or Firm* — Scully, Scott, Murphy & Presser PC (57) ABSTRACT An information processing device includes an acquiring unit, an image page selecting unit, a reducing unit, and an outputting unit. The acquiring unit acquires a file including a plurality of pages. At least one of a character and an image is carried on each page. The image page selecting unit selects a page containing the image from the plurality of pages. The reducing unit generates a reduced-size page carrying a reduced-size image from the selected page. The outputting unit outputs the reduced-size image.

33 Claims, 7 Drawing Sheets

(56) References Cited

U.S. PATENT DOCUMENTS

| | | | |
|---|---|---|---|
| 2003/0144904 A1* | 7/2003 | Beckman et al. | 705/14 |
| 2004/0125394 A1* | 7/2004 | Terao et al. | 358/1.13 |
| 2005/0190405 A1* | 9/2005 | Tomita | 358/1.18 |
| 2006/0028659 A1* | 2/2006 | Nishikawa | 358/1.2 |
| 2006/0033967 A1 | 2/2006 | Brunner | |
| 2006/0075339 A1* | 4/2006 | Tomita et al. | 715/530 |
| 2006/0095436 A1* | 5/2006 | Abe | 707/10 |
| 2006/0170948 A1* | 8/2006 | Kobashi | 358/1.13 |

FOREIGN PATENT DOCUMENTS

| | | |
|---|---|---|
| JP | 10-187941 | 7/1998 |
| JP | 2002-112004 | 4/2002 |
| JP | 2004-96688 | 3/2004 |
| JP | 2004-202928 | 7/2004 |
| JP | 2004-255729 | 9/2004 |
| JP | 2005-43773 | 2/2005 |
| JP | 2006-54885 | 2/2006 |
| JP | 2007-253572 | 10/2007 |
| JP | 2007-259352 | 10/2007 |

* cited by examiner

| BOOKMARK | TEXT |
|---|---|
| 1st CHAPTER SUMMARY<br>2nd CHAPTER INSTALL<br>3rd CHAPTER OPERATING METHOD<br>4th CHAPTER TOOLS | 1ST CHAPTER SUMMARY<br><br>INSTRUCTION<br>. . . . . . . .<br>. . . . . . . . |

FIG.8

| DESIGNATED FONT | CONDITIONS (ATTRIBUTES) | | |
|---|---|---|---|
| | SIZE | BOLD | UNDERLINE |
| MS Mincho | 12 POINT OR LESS | NONE | NONE |
| Times New Roman | 14 POINT OR LESS | NONE | NONE |

INFORMATION PROCESSING DEVICE

CROSS REFERENCE TO RELATED APPLICATIONS

This application claims priority from Japanese Patent Application No. 2006-084263 filed Mar. 24, 2006. The entire content of priority application is incorporated herein by reference.

BACKGROUND OF THE INVENTION

1. Field of the Invention

The present invention relates to an information processing device.

2. Description of Related Art

In recent years, printers capable of printing electronic files stored in a removable medium without using an information terminal such as a computer (PC) have been developed. In such printers, by attaching the removable medium to such printer, the electronic files stored in the removable medium can be easily printed. The electronic files include not only bitmapped images taken by a digital still camera but also document files such as PDF files generated by PC.

In order to confirm the electronic files stored in the removable medium, such printer has an index printing function of placing and printing reduced-size images and electronic file names in the electronic files on a recording paper. Such printing device is disclosed in Japanese Patent Application Publication No. 2002-112004.

SUMMARY OF THE INVENTION

Aspects of the present invention relate to an image-information processing device having an index printing or display function which is easy to recognize contents of files.

One aspect of the present invention provides an information processing device including an acquiring unit, an image page selecting unit, a reducing unit, and an outputting unit. The acquiring unit acquires a file including a plurality of pages. At least one of a character and an image is carried on each page. The image page selecting unit selects a page containing the image from the plurality of pages. The reducing unit generates a reduced-size page carrying a reduced-size image from the selected page. The outputting unit outputs the reduced-size image.

Another aspect of the present invention provides an information processing device including an acquiring unit, a color page selecting unit, a reducing unit, and an outputting unit. The acquiring unit acquires a file including a plurality of pages. At least one of a character and an image is carried on each page. The color page selecting unit selects a page containing color image information from the plurality of pages. The reducing unit generates a reduced-size page carrying a reduced-size color image from the selected page. The outputting unit outputs the reduced-size color image.

Another aspect of the present invention provides an information processing device including an acquiring unit, a leading page selecting unit, a reducing unit, and an outputting unit. The acquiring unit acquires a file including a plurality of pages. At least one of a character and an image is carried on each page. The plurality of pages is divided into a plurality of chapters. The leading page selecting unit selects a leading page of each chapter. The reducing unit generates a reduced-size page from each selected leading page. The outputting unit outputs the reduced-size pages.

Another aspect of the present invention provides an information processing device including an acquiring unit, a specific page selecting unit, a reducing unit, and an outputting unit. The acquiring unit acquires a file including a plurality of pages. Page data is written in each page. The specific page selecting unit reads the page data and selects, from the plurality of pages, a specific page including page data corresponding to information inputted from an external device. The reducing unit generates a reduced-size page from the selected specific page. The outputting unit outputs the reduced-size page.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

An information processing device according to preferred embodiments of the present invention will be described while referring to the accompanying drawings wherein like parts and components are designated by the same reference numerals to avoid duplicating description.

Figure 1:
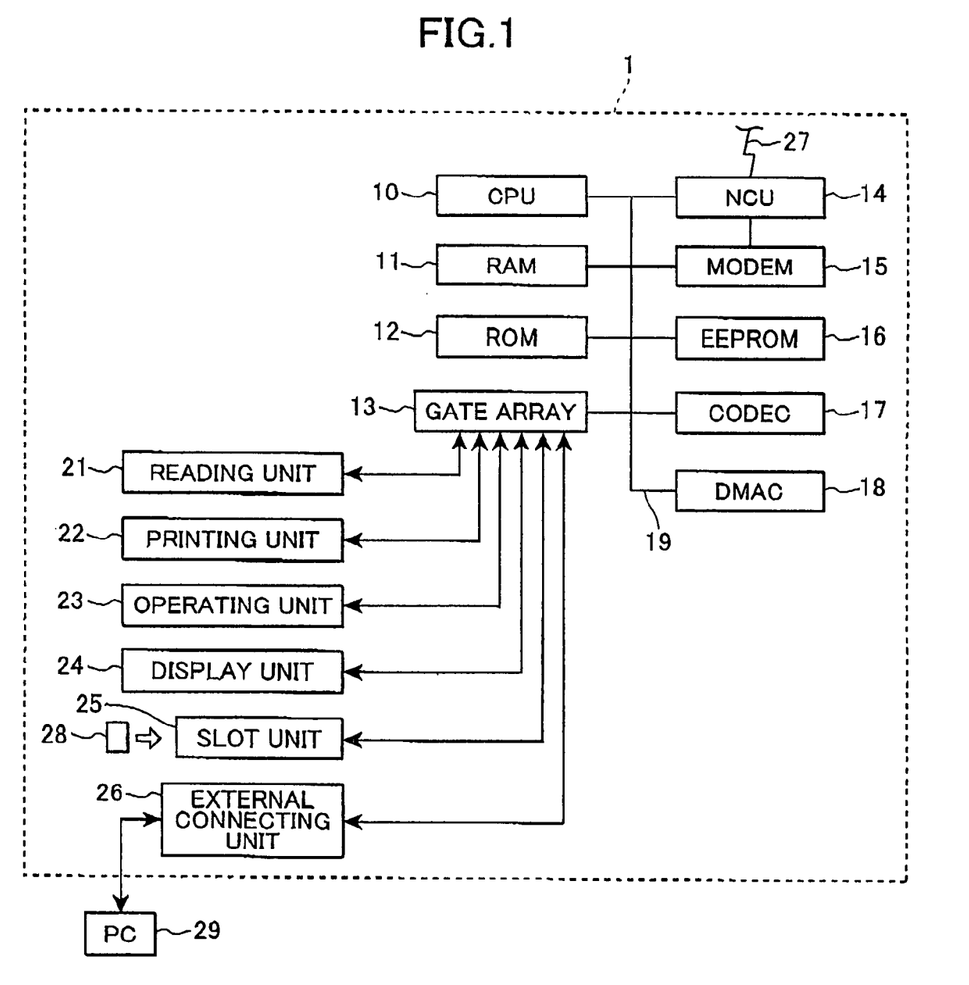
FIG. 1 is a block diagram of a compound machine 1.

Embodiments of the present invention will be described with reference to figures. FIG. 1 is a block diagram of a compound machine as an example of an image-information processing device according to the present invention. The compound machine 1 has a faxing function, a copying function and a scanning function and includes a CPU 10, a RAM 11, a ROM 12, a gate array 13, an NCU (Network Control Unit) 14, a modem 15, an EEPROM 16, a codec 17 and a DMAC (Direct Memory Access Controller) 18. These elements are interconnected with a bus line 19. The bus line 19 includes an address bus, a data bus and a control signal line. A reading unit 21, a printing unit 22, an operating unit 23, a display unit 24, a slot unit 25 and an external connecting unit 26 are connected to the gate array 13. A telephone circuit 27 is connected to the NCU 14.

Figure 2:
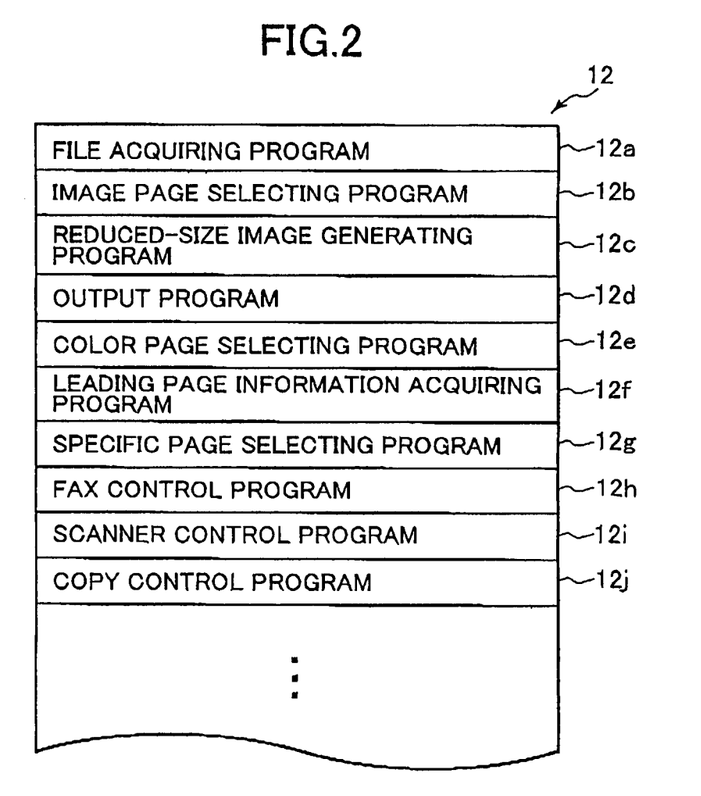
FIG. 2 shows a program stored in a ROM 12.

The CPU 10 controls whole operation of the compound machine 1. As shown in FIG. 2, various programs including a file acquiring program 12a, an image page selecting program 12b, a reduced-size image generating program 12c, an output program 12d, a color page selecting program 12e, a leading page information acquiring program 12f, a specific page selecting program 12g, a FAX control program 12h, a scanner control program 12i and a copy control program 12j are stored in the ROM 12.

The file acquiring program 12a is a program for acquiring a file stored in a storage medium 28 or a personal computer (PC) 29. The image page selecting program 12b is a program for selecting a page containing image information from a plurality of pages contained in one file. The reduced-size image generating program 12c is a program for generating reduced-size images of the selected page. The output program 12d is a program for printing or displaying the generated reduced-size images. The color page selecting problem 12e is a program for selecting a page containing color character information or color image information from a plurality of pages contained in one file. The leading page information acquiring program 12f is a program for acquiring information of a leading page of each chapter of a file. The specific page selecting program 12g is a program for selecting a specific page from a plurality of pages contained in one file on the basis of input information.

The FAX control program 12h, the scanner control program 12i and the copy control program 12j which are stored in the ROM 12 are programs for controlling the faxing function, the copying function and the scanning function, respectively.

The compound machine 1 is connected to the NCU 14. The NCU 14 is connected to the public telephone circuit 27 and controls (connects or disconnects) the circuit. The RAM 11 is used as a line buffer memory for an operating region of the CPU 10 and an expanding region of a read image. The modem 15 modulates and demodulates facsimile data. The ROM 12 stores various programs shown in FIG. 2 and data such as setting values therein. The EEPROM 16 stores various flags and setting information therein. The codec 17 codes and decodes facsimile data. The DMAC 18 mainly writes and reads data to and from the RAM 11.

The gate array 13 functions as an input/output interface between the CPU 10 and the units such as the reading unit 21. The reading unit 21 has an image sensor and an LED light source and reads images such as characters and drawing from a manuscript. The printing unit 22 prints the images such as characters and drawing according to an ink jet method or a laser method. The operating unit 23 has a key switch group formed of a ten key and letter keys and transmits an instruction corresponding to a key operation by the user to the CPU 10. The display unit 24 has a panel such as an LCD and displays an operation state, operation guidance and the reduced-size images thereon. The slot unit 25 has a connector for connecting various kinds of storage media 28 having a flash memory such as Smartmedia, Compact Flash (registered trademark), a USB memory therein and functions as a reader/writer for reading or writing data from or to the storage medium 28. The external connecting unit 26 has a connecting port which conforms to standards of centronics parallel interface or USB (Universal Serial Bus) and exchanges data and signals with the personal computer (PC) 29.

The compound machine 1 has a function of printing data as a peripheral device of the personal computer 29 and a so-called direct printing function of directly reading data from the storage medium 28, which is used in a digital camera and the like, inserted into the slot unit 25, and printing the data. As described later, the compound machine 1 outputs reduced-size images 33 of a print document file (for example, a file in pdf (portable document format) format) stored in the storage medium 28 together with a file name 31 and a page number 32 as index images. Similarly, the display unit 24 displays the reduced-size image 33 of the print document file together with a file name 31 and a page number 32 thereon.

Figure 3:
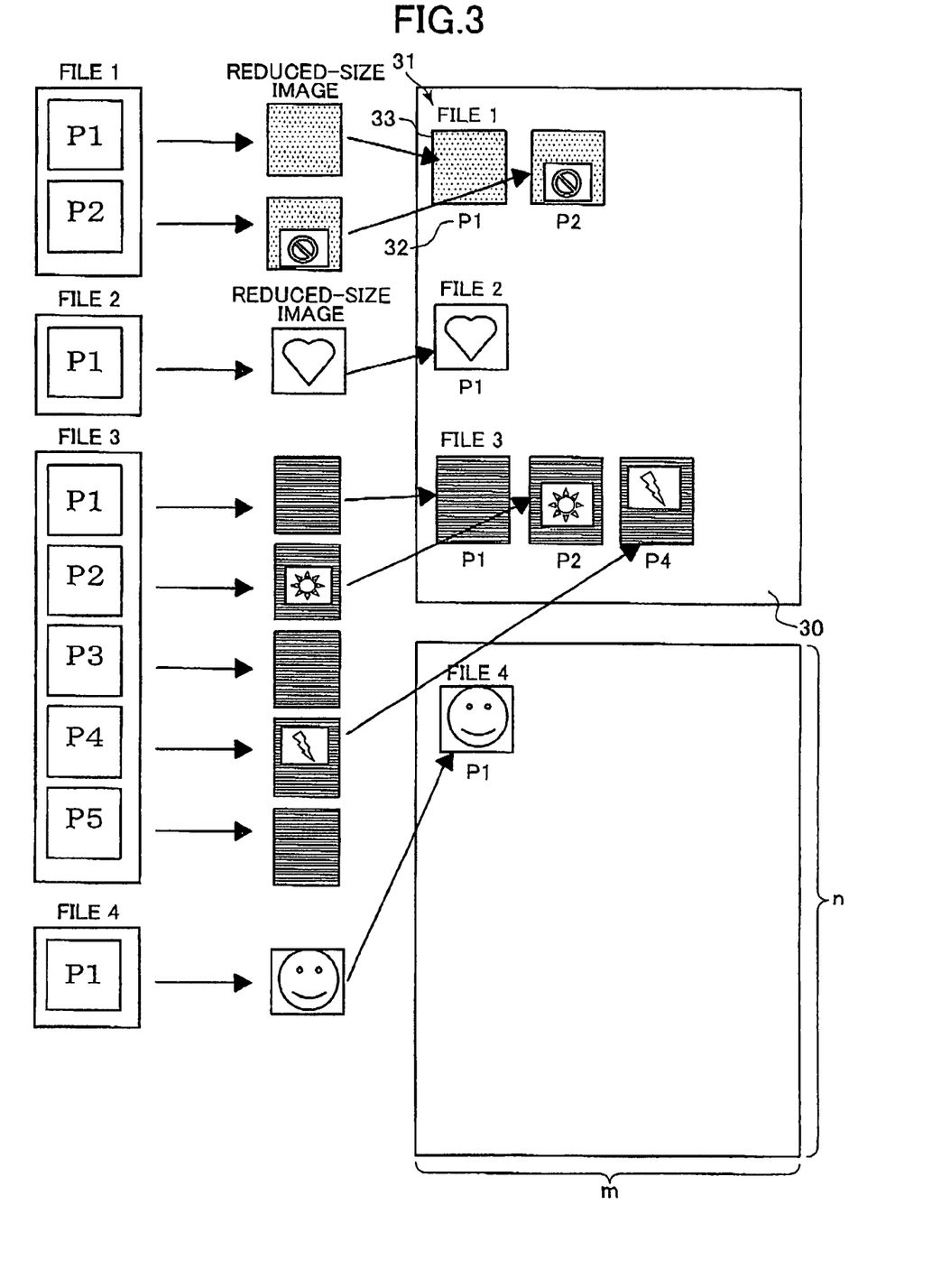
FIG. 3 shows an example of index printing.

FIG. 3 shows an example of index printing. In this embodiment, four files of files 1 to 4 are stored in a storage medium 28. Reduced-size images of the leading pages and pages containing image information are printed in a paper 30.

More specifically, the file is formed of P1 containing only characters and P2 containing image information. The file 2 is formed of only image information (P1). The file 3 is formed of P1, P3 and P5 which contain only characters and P2 and P4 which contain image information. The file 4 is formed of only image information (P1). The file 2 and the file 4 are formed of one page of bitmapped images such as JPEG. The file 1 and the file 3 contain a plurality of pages such as PDF.

In the case of PDF, for example, the image page selecting program 12b determines that the page includes an image when an object type "Image" is written in page data of the page.

The reduced-size images 33 of the leading page (P1) and the page (P2) containing image information in the file 1, the reduced-size image 33 of the leading page (P1) of the file 2, and the reduced-size images 33 of the leading page (P1) and pages (P2, P4) containing image information in the file 3 are printed on the paper 30. Since P3 and P5 of the file 3 contain only characters, the reduced-size images 33 of the pages are not printed. Since only reduced-size images 33 of the leading page (P1) and pages (P2, P4) containing image information in the file 3 are printed, the user can easily grasp contents of the file by looking at the images 33. The reduced-size image 33 of P1 of the file 4 is printed on a second sheet.

In conventional index printing, only one reduced-size image 33 per file is printed. However, in this embodiment, the reduced-size images 33 of a plurality of pages of one file can be printed. By viewing any of the plurality of reduced-size images 33, contents of the file can be easily grasped. The reduced-size images 33 of all target pages may be printed. Further, the maximum page number for printing is set, and the reduced-size images 33 corresponding to the maximum page number may be printed.

The reduced-size image 33 is printed together with a file name 31 and a page number 32. Thus, when performing direct printing, the user can designate the file name 31 and the page number 32 while viewing the result of index printing in FIG. 3.

In the embodiment shown in FIG. 3, a new line is started after P2 of the file 1. In addition, a new line is started after P1 of the file 2. By starting a new line for each file, the user can easily recognize contents of the files when viewing the index printing.

In this embodiment, the leading pages (P1) of the files 1 and 3, which contain only characters, are printed. Only pages containing image information may be printed without printing pages containing only characters. That is, in FIG. 3, only P2 of the file 1, P1 of the file 2, P2 and P4 of the file 3 and P1 of the file 4 may be printed.

Figure 4:
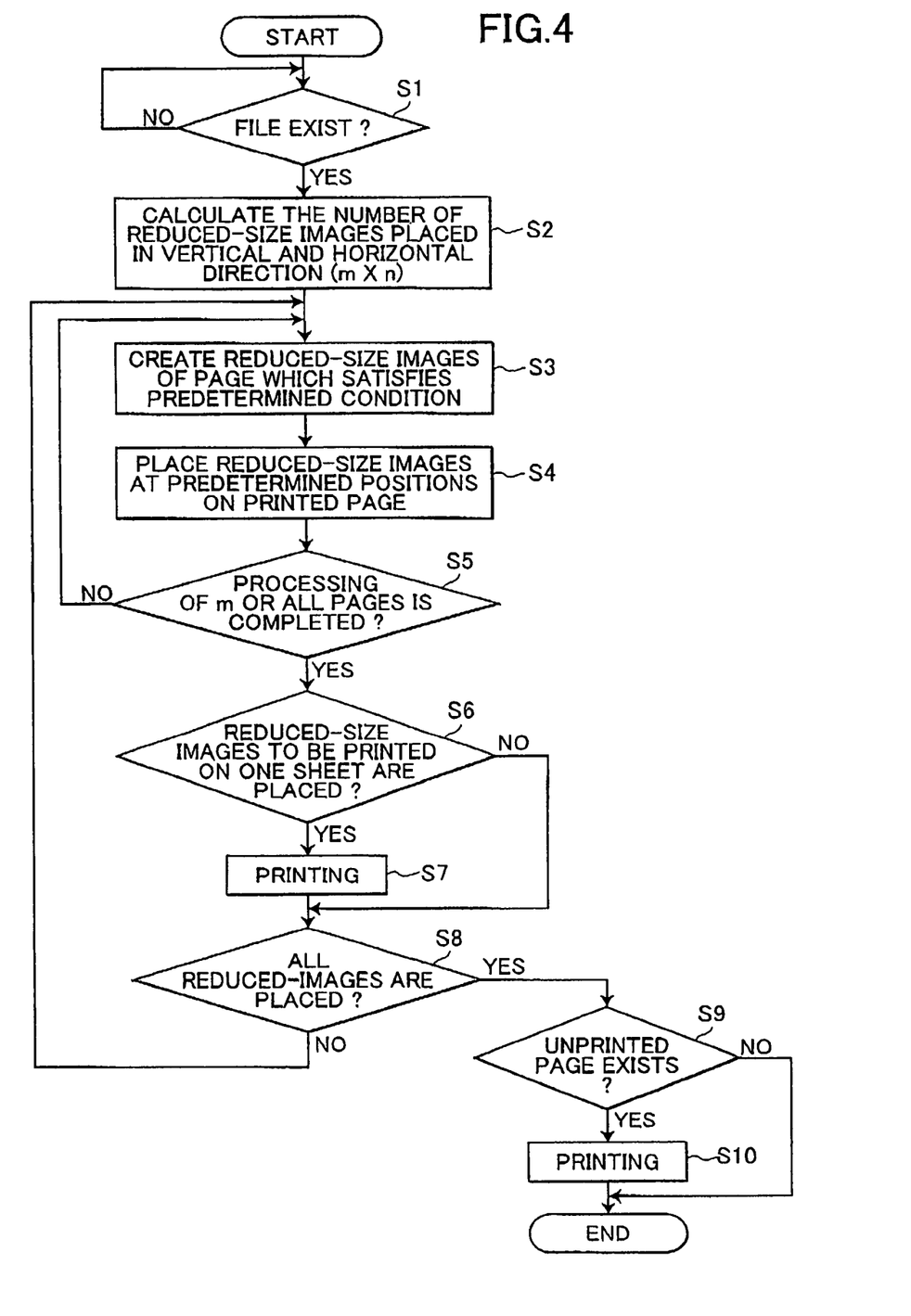
FIG. 4 is a flow chart in a case where index printing is performed.

Next, FIG. 4 is a flow chart for performing printing shown in FIG. 3. When the user performs an operation of performing index printing, the flow chart is started. First, processing at a step S1 is executed. At S1, it is determined whether or not there exist files. In the case of No at S1, the procedure returns to S1. In the case of Yes at S1, the number of the reduced-size images 33 to be placed on one sheet of the paper 30 or the plurality of paper 30 in the vertical and horizontal directions (m×n) is calculated on the basis of the size of the paper 30 and the reduced-size image 33 at S2.

For example, in the case in FIG. 3, since four reduced-size images and three reduced-size images can be placed in the horizontal direction and in the vertical direction, respectively, it is calculated that m is 4 and n is 3.

Next, the procedure proceeds to S3. At S3, the reduced-size images 33 which satisfy a predetermined condition are generated. In the present embodiment, the pages which satisfy the predetermined condition mean, for example, pages containing image information. Whether image information is contained or not is determined by an image page selecting program 12b on the basis whether, for example, an image command is contained in a target page. Thus, at S3, processing is executed so as to generate the reduced-size image 33 of each page. However, if the image command is not contained in the page, the procedure proceeds to the processing for the next page without generating the reduced-size image of the page.

At S3, the reduced-size image 33 of the page containing color characters or color image information may be generated. Since color characters or color image information are easily viewable, contents of the page can be easily grasped by viewing the reduced-size image 33. To determine whether color characters or color image information are contained, it is determined whether or not a color font, for example, is contained by a color page selecting program 12e. In the case of PDF, for example, the color page selecting program 12e determines that the page is a color page when argument is written with respect to any of cyan, magenta, or yellow in K command of the page. Thus, only the reduced-size image 33 of the page containing the color font can be generated.

Figure 7:
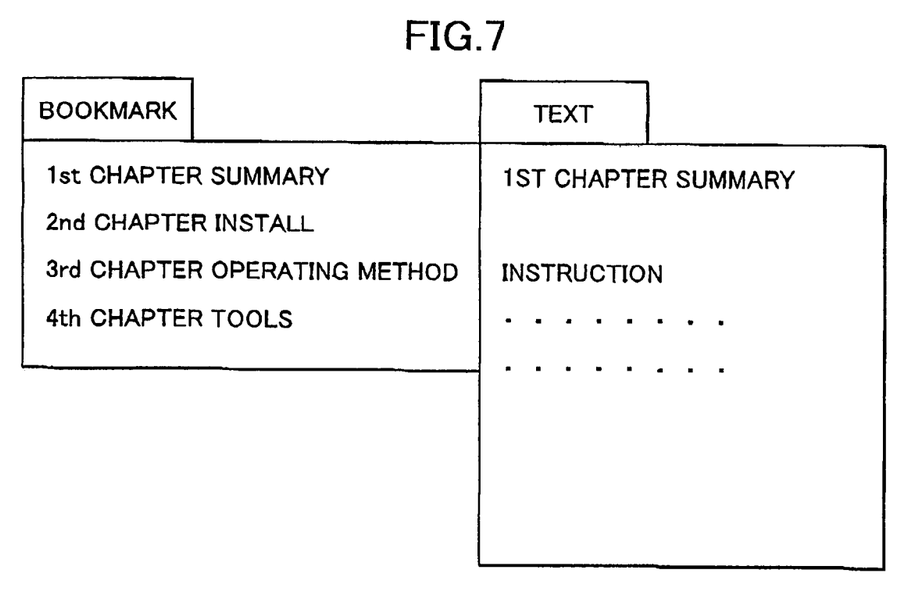
FIG. 7 shows an example of a bookmark.

At S3, the reduced-size image 33 of the leading page of each chapter may be generated. For example, as shown in FIG. 7, the file is formed of a plurality of chapters. Reference to the leading page of each chapter enables the user to easily grasp contents of the file. In the example shown in FIG. 7, an index page (bookmark) is contained. The index page stores a start page number of each chapter therein. By reading the index page by a leading page information acquiring program 12f for acquiring leading page information of each chapter, the reduced-size image 33 of the page can be rapidly generated. In the case of PDF, for example, the leading page information acquiring program 12f determines that the page is a leading page when an object type "Page" is written in page data of the page. If the text is read from the beginning to the end without using the index page, it takes time. Since file format of the PDF file as shown in FIG. 7 is open to the public, it is possible to determine which part of the file contains bookmark information. The predetermined condition is inputted either from PC 29 via the external connecting unit 26 or from the operating unit 23.

Figure 8:
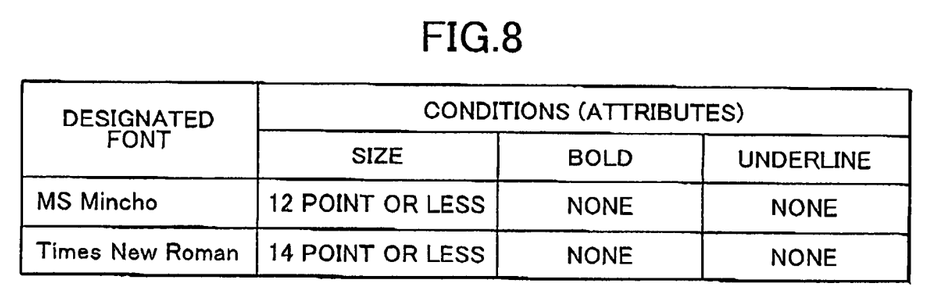
FIG. 8 is a table showing combination of specific font, character size, boldtype and underline.

At S3, a specific page may be selected from pages contained in one file by a specific page selecting program 12g on the basis of input information to print the reduced-size image of the selected page. FIG. 8 is a table showing combination of conditions such as character size and font. As shown in FIG. 8, the user can designate MS Mincho or Times New Roman as a specific font and character size (for example, 12 point or less, 14 point or less). Presence or absence of boldface or underline may be also designated. When the page containing a specific font is selected by the specific page selecting 12g, as shown in FIG. 8, the page containing the font designated by the user is selected and the reduced-size image 33 of the page is printed. When a font which is not usually used is designated as the specific font, since the reduced-size image 33 of the page containing the characteristic font which is not usually used is printed, the user can easily grasp contents of the file by viewing the reduced-size image 33. On the contrary, the specific page selecting program 12g selects the page which does not contain the specific font, the page which does not contain the font designated by the user is selected and the reduced-size image 33 of the page is printed. When a font which is usually used is designated as the specific font, since the reduced-size image 33 of the page containing the characteristic font which is not usually used is printed, the user can easily grasp contents of the file by viewing the reduced-size image 33.

Instead of font, a leading page of a chapter, an image page, or, a color page may be selected as the specific page.

Following the processing at S3, the procedure proceeds to S4 and the reduced-size image 33 is placed on a predetermined position on the paper 30. Then, the procedure proceeds to S5, and it is determined whether or not m or all reduced-size images 33 are placed. The state where m reduced-size images 33 are placed means, in the example shown in FIG. 3, the state where four reduced-size images 33 are placed abreast in a line. The state where all reduced-size images 33 are placed means, for example, the state where the reduced-size image 33 of P2 as a last page in the file 1 in FIG. 3 is placed. In the case of Yes at S5, the procedure proceeds to S6. In the case of No at S5, the procedure returns to S3. By repeating the processing at S3 to S5, m or all reduced-size images 33 contained in one file are placed.

At S6, it is determined whether or not the reduced-size images 33 are printed on one sheet of the paper 30 at S6. For example, in FIG. 3, it is determined as Yes when P4 of the file 3 is placed and it is determined as NO in the other cases. In the case of Yes, the procedure proceeds to S7, and the reduced-size images for the paper 30 are printed on the paper 30. Then, at S8, it is determined whether or not all of the reduced-size images 33 contained in all of the files have been placed on the corresponding paper 30. In the cases of No at S6, the procedure also proceeds to S8 without performing printing at S7. In the case of No at SB, the procedure proceeds to S3 for placing all of the reduced-size images 33 contained in all of the files on the corresponding papers 30.

By performing the processes of S3 to SB, the reduced-size images 33 in one file are sequentially placed on one sheet of the paper 30. For example, as shown in FIG. 3, the reduced-size images 33 are placed from the upper left of the paper 30 sequentially. If all of the reduced-size images 33 corresponding to all of the pages contained in one file have been placed on the paper 30, the same processing is performed for a next file. Then, after the sheet 30 has been filled with the reduced-size images 33, the reduced-size images 33 placed on the paper 30 are printed on the paper 30 by the output program 12d.

Here, the last paper 30 may not have been filled with the reduced-size images 33 even if all of the reduced-size images 33 contained in all of the files have been placed on the papers 30. In such a case, the reduced-size images 33 placed on the last paper 30 are not printed at S7 since the last paper 30 has not been filled with the reduced-size images 33. Therefore, in the case of Yes at S8, it is determined whether or not there exists an unprinted paper 30, that is, whether or not there exists any reduced-size image 33 that has not been printed. In the case of Yes at S8, the unprinted reduced-size images 33 are printed at S9, and then the procedure is finished. In the case of No at S8, the procedure is finished without performing printing at S9.

Figure 5A:
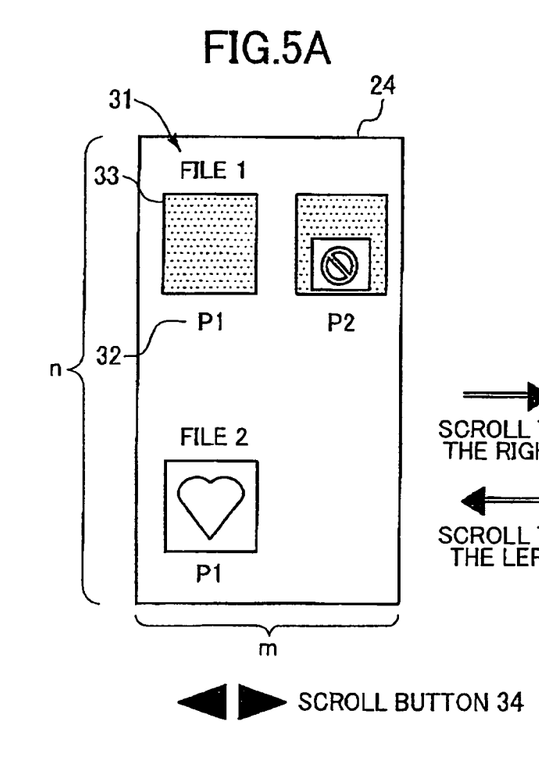
FIG. 5 shows an example of index display.

Next, FIG. 5 shows an example of index display. When an instruction of index display is issued by the user, first, a state shown in FIG. 5(A) is displayed. Here, the reduced-size images 33 of the leading page (P1) and the page (P2) containing image information in the file 1 are displayed on the display unit 24. The reduced-size image 33 of the leading page (P1) of the file 2 is also displayed. Since the reduced-size images 33 of the leading page and the page containing image information are displayed on the screen in this manner, the user can easily grasp contents of the file by viewing the screen.

In this embodiment, the display unit 24 is formed to be smaller than the paper 30 (refer to FIG. 3). When three images and four images are displayed in the vertical and horizontal directions, respectively, as shown in FIG. 3, the reduced-size images 33 become too small and are hard to be seen. Thus, two images and two images are displayed in the vertical and horizontal directions, respectively, as shown in FIG. 5(A).

Figure 5B:
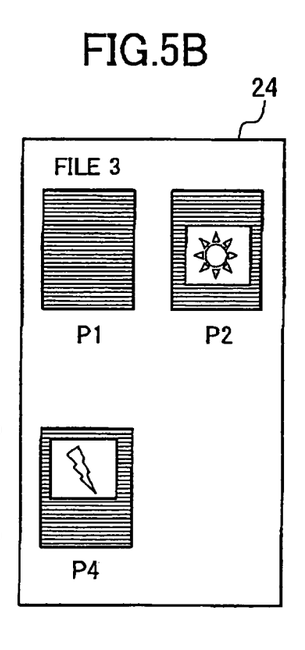
Figure 5C:
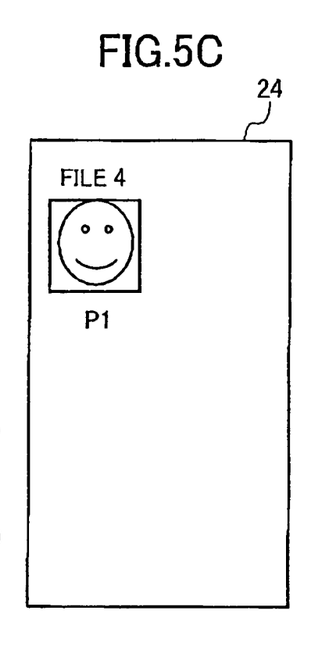

When a scroll button 34 is pressed to the right in the state shown in FIG. 5(A), the screen moves to a state shown in FIG. 5(B). Here, the reduced-size images 33 of P1, P2 and P4 of the file 3 are displayed. The scroll button 34 is further pressed to the right, the screen moves to a state shown in FIG. 5(C) and the reduced-size image 33 of P1 of the file 4 is displayed. When the scroll button 34 is pressed to the left, the screen returns to the state shown in FIG. 5(B).

Figure 6:
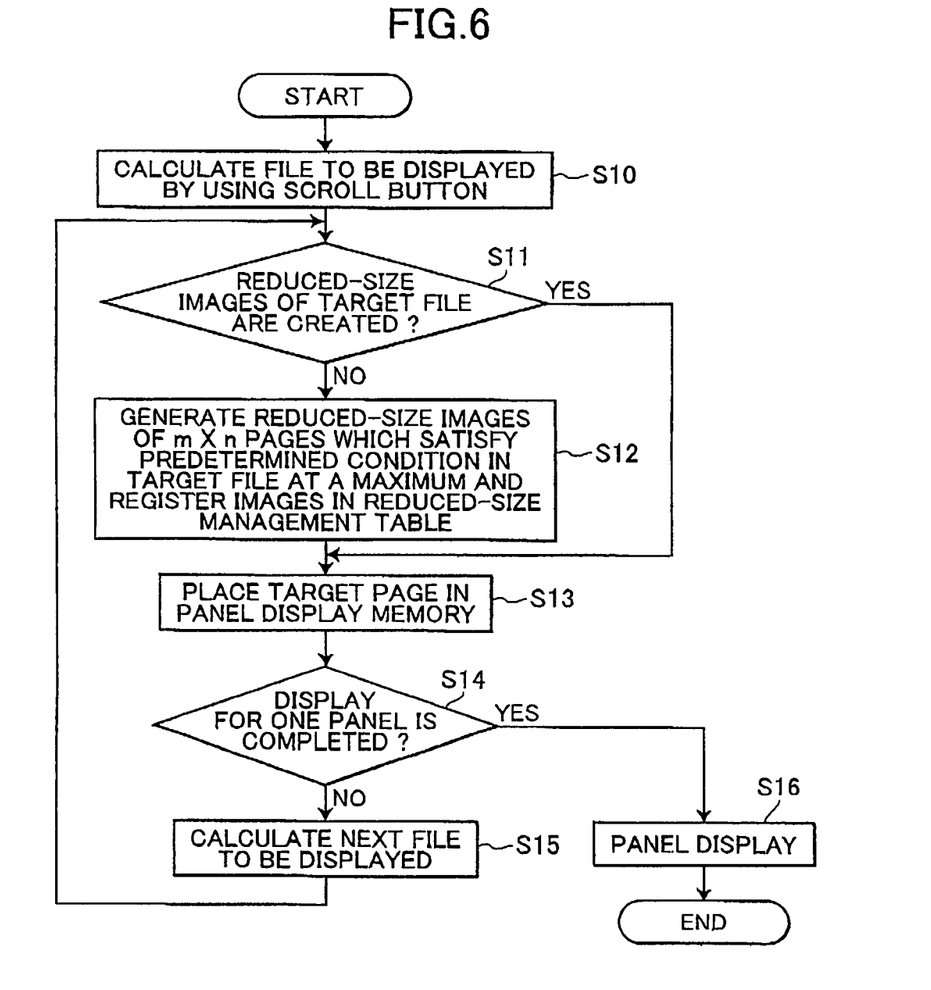
FIG. 6 is a flow chart in a case where index display is performed.

FIG. 6 is a flow chart for performing the index display shown in FIG. 5(A) to FIG. 5(C). When the user performs an operation for performing index display, the flow chart is started and processing at a step S10 is performed. At S10, a file to be displayed is calculated on the basis of the operation of the scroll button 34. That is, since the displayed file changes according to the operation of the scroll button 34 as shown in FIG. 5(A) to FIG. 5(C), the file to be displayed is calculated.

Then, the procedure proceeds to S11 and it is determined whether or not the reduced-size images 33 of the target file are generated. In the case of Yes at S11, the procedure proceeds to S13. In the case of No at S11, the procedure proceeds to S12. At S12, m×n reduced-size images 33 of the page which satisfies a predetermined condition in the target file are generated at a maximum and the generated reduced-size images 33 are stored in a reduced-size image management table. To generate the reduced-size images 33 which can be displayed on the display unit 24, m×n reduced-size images 33 are generated at a maximum. The abovementioned reduced-size image management table is a table for managing the reduced-size images 33. For example, a predetermined storage area of the RAM 11 is used to store the table therein. The pages which satisfy the predetermined condition include the page containing image information, the page containing color characters and color image information, the page which corresponds to information designated by the user (specific font, character size and presence or absence of boldface or underline) and the leading page of each chapter. Since the processing of creating the reduced-size images 33 of the pages which satisfy the predetermined condition is described in terms of S3 in FIG. 4, detailed description thereof is omitted.

Then, the procedure proceeds to S13 and processing of placing the reduced-size images 33 to be displayed in a panel display memory is performed. After that, the procedure proceeds to S14 and it is determined whether or not placement of the reduced-size images 33, which is necessary for single display, is completed. In the case of Yes at S14, the procedure proceeds to S16 and panel display is performed. In the case of No at S14, the procedure proceeds to S15 and the next file to be displayed is calculated and then, the procedure returns to S11.

As described above, in the printing or display device in accordance with this embodiment, in the case of a document having a plurality of pages, by printing or displaying the reduced-size image of the page containing an image, the reduced-size image of the page containing a color page, the reduced-size image of the leading page of each chapter or the reduced-size image of the specific page, contents of the file can be easily recognized.

While the invention has been described in detail with reference to the specific embodiment thereof, it would be apparent to those skilled in the art that various changes and modifications may be made therein without departing from the spirit of the invention.

What is claimed is:

1. An information processing device comprising:
   an acquiring unit configured to acquire at least one file including a plurality of pages, at least one of a character or an image being carried on each page;
   an image page selecting unit configured to select at least one image-containing page from the plurality of pages without selecting pages carrying only characters;
   a reducing unit configured to generate at least one reduced-size page carrying a reduced-size image from the respective selected at least one page; and
   an outputting unit configured to output the at least one reduced-size page.

2. The information processing device according to claim 1, wherein the outputting unit is configured to print the reduced-size image on a recording medium.

3. The information processing device according to claim 1, further comprising a display on which the outputting unit is configured to display the reduced-size image.

4. The information processing device according to claim 1, wherein the outputting unit is further configured to output a file name with respect to each file of the at least one file.

5. The information processing device according to claim 1, wherein the outputting unit is further configured to output a page number with respect to each selected at least one page.

6. The information processing device according to claim 1, further comprising an external terminal connectable to an external media including the file, wherein the acquiring unit is configured to acquire the file from the external media.

7. The information processing device according to claim 1, wherein a plurality of the at least one reduced-size page is output on a single output medium simultaneously.

8. An information processing device comprising:
   an acquiring unit configured to acquire at least one file including a plurality of pages, at least one of a character and an image being carried on each page;
   a color page selecting unit configured to select at least one page containing color image information from the plurality of pages without selecting pages not containing color image information;
   a reducing unit configured to generate at least one reduced-size page carrying a reduced-size color image from the respective selected at least one page; and
   an outputting unit configured to output the at least one reduced-size page.

9. The information processing device according to claim 8, wherein the outputting unit is configured to print the reduced-size color image on a recording medium.

10. The information processing device according to claim 8, further comprising a display on which the outputting unit is configured to display the reduced-size color image.

11. The information processing device according to claim 8, wherein the outputting unit is further configured to output a file name with respect to each file of the at least one file.

12. The information processing device according to claim 8, wherein the outputting unit is further configured to output a page number with respect to each selected at least one page.

13. The information processing device according to claim 8, further comprising an external terminal connectable to an external media including the file, wherein the acquiring unit is configured to acquire the file from the external media.

14. The information processing device according to claim 8, wherein a plurality of the at least one reduced-size page is output on a single output medium simultaneously.

15. An information processing device comprising:
   an acquiring unit configured to acquire at least one file including a plurality of pages, at least one of a character and an image being carried on each page, the plurality of pages being divided into a plurality of chapters;

a leading page selecting unit configured to select only a leading page of each chapter;

a reducing unit configured to generate at least one reduced-size page from each at least one selected leading page; and an outputting unit configured to output the at least one reduced-size page arranged in a plane without outputting non-selected pages.

16. The information processing device according to claim 15, wherein the file includes an index page having information with respect to the leading pages, wherein the leading page selecting unit is configured to look up the index page to select the leading pages.

17. The information processing device according to claim 15, wherein the outputting unit is configured to print the reduced-size pages on a recording medium.

18. The information processing device according to claim 15, further comprising a display on which the outputting unit is configured to display the reduced-size pages.

19. The information processing device according to claim 15, wherein the outputting unit is further configured to output a file name with respect to each file of the at least one file.

20. The information processing device according to claim 15, wherein the outputting unit is further configured to output a page number with respect to each selected leading page.

21. The information processing device according to claim 15, further comprising an external terminal connectable to an external media including the file, wherein the acquiring unit is configured to acquire the file from the external media.

22. The information processing device according to claim 15, wherein a plurality of the at least one reduced-size page is output on a single output medium simultaneously.

23. An information processing device comprising:

an acquiring unit configured to acquire at least one file including a plurality of pages, page data being included in each page;

a specific page selecting unit configured to read the page data and only select, from the plurality of pages, at least one specific page including page data corresponding to information inputted from an input unit;

a reducing unit configured to generate at least one reduced-size page from the respective selected at least one specific page; and an outputting unit configured to output the at least one reduced-size page arranged in a plane without outputting non-selected pages.

24. The information processing device according to claim 23, wherein the information indicates a predetermined font.

25. The information processing device according to claim 23, wherein the information indicates a predetermined size of the character.

26. The information processing device according to claim 23, wherein the information indicates an image.

27. The information processing device according to claim 23, wherein the information indicates a leading page of a chapter.

28. The information processing device according to claim 23, wherein the outputting unit is configured to print the reduced-size page on a recording medium.

29. The information processing device according to claim 23, further comprising a display on which the outputting unit is configured to display the reduced-size page.

30. The information processing device according to claim 23, wherein the outputting unit is further configured to output a file name with respect to each file of the at least one file.

31. The information processing device according to claim 23, wherein the outputting unit is further configured to output a page number with respect to the selected page.

32. The information processing device according to claim 23, further comprising an external terminal connectable to an external media including the file, wherein the acquiring unit is configured to acquire the file from the external media.

33. The information processing device according to claim 23, wherein a plurality of the at least one reduced-size page is output on a single output medium simultaneously.

* * * * *